(12) United States Patent
Buttolph

(10) Patent No.: US 9,933,097 B2
(45) Date of Patent: Apr. 3, 2018

(54) RING COUPLINGS

(71) Applicant: Simmonds Precision Products, Inc., Vergennes, VT (US)

(72) Inventor: Martin E. Buttolph, Middlebury, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 917 days.

(21) Appl. No.: 14/446,944

(22) Filed: Jul. 30, 2014

(65) Prior Publication Data

US 2016/0033069 A1 Feb. 4, 2016

(51) Int. Cl.
| | | |
|---|---|---|
| F16B 7/04 | (2006.01) | |
| F16L 37/113 | (2006.01) | |
| F42B 15/36 | (2006.01) | |
| F16L 37/10 | (2006.01) | |
| F16B 21/18 | (2006.01) | |

(52) U.S. Cl.
CPC ........... *F16L 37/113* (2013.01); *F16L 37/101* (2013.01); *F42B 15/36* (2013.01); *F16B 7/042* (2013.01); *F16B 21/18* (2013.01)

(58) Field of Classification Search
CPC ....... F16L 37/101; F16L 37/113; F42B 15/36; F42B 15/38; F16B 21/18; F16B 2/065; F16B 2/08
See application file for complete search history.

(56) References Cited

U.S. PATENT DOCUMENTS

| | | | |
|---|---|---|---|
| 3,116,547 A | 1/1964 | Nepple | |
| 3,287,032 A | 11/1966 | Kraybill | |
| 3,505,925 A * | 4/1970 | Carr | B64D 1/02 |
| | | | 102/378 |
| 4,184,242 A * | 1/1980 | Petrie | B21D 53/20 |
| | | | 140/88 |
| 4,209,193 A * | 6/1980 | Ahlstone | E21B 17/046 |
| | | | 285/24 |
| 4,563,116 A * | 1/1986 | Edens | B23B 31/113 |
| | | | 279/20 |
| 4,830,408 A * | 5/1989 | Reimert | E21B 17/046 |
| | | | 285/27 |

(Continued)

FOREIGN PATENT DOCUMENTS

| | | | | |
|---|---|---|---|---|
| EP | 0239556 A1 * | 9/1987 | ............. | F16B 21/18 |
| EP | 2002197 A2 | 12/2008 | | |
| EP | 2980523 A1 * | 2/2016 | ............ | F16L 37/101 |

OTHER PUBLICATIONS

Search Report and Opinion issued by the European Patent Office dated Nov. 27, 2015 for European Patent Application No. 15178339.

*Primary Examiner* — Jonathan Masinick
(74) *Attorney, Agent, or Firm* — Locke Lord LLP; Scott D. Wofsy; Joshua L. Jones

(57) ABSTRACT

A ring coupling includes a first cylindrical body defining an outward facing coupling surface extending in a circumferential direction. A second cylindrical body defines an inward facing coupling surface extending in the circumferential direction. A retainer ring is engaged to the coupling surfaces of the first and second cylindrical bodies to prevent axial disengagement of the first and second cylindrical bodies. The cylindrical bodies can be coupled without relative circumferential rotation of the first and second cylindrical bodies.

12 Claims, 6 Drawing Sheets

(56) References Cited

U.S. PATENT DOCUMENTS

| | | | |
|---|---|---|---|
| 4,951,972 A * | 8/1990 | Macintyre | E21B 33/0415 285/123.3 |
| 5,103,734 A | 4/1992 | Arnaud et al. | |
| 5,183,962 A | 2/1993 | Karius et al. | |
| 5,286,135 A * | 2/1994 | James | F16B 3/04 403/319 |
| 5,301,408 A | 4/1994 | Berman et al. | |
| 5,394,803 A | 3/1995 | Mort | |
| 5,411,349 A | 5/1995 | Hornung et al. | |
| 5,490,694 A | 2/1996 | Shumway | |
| 5,678,607 A * | 10/1997 | Krywitsky | F16L 15/001 138/89 |
| 5,735,114 A | 4/1998 | Ellingsen | |
| 2008/0011180 A1 | 1/2008 | Stimpson | |
| 2015/0211832 A1* | 7/2015 | Travis | F42B 15/36 285/90 |

\* cited by examiner

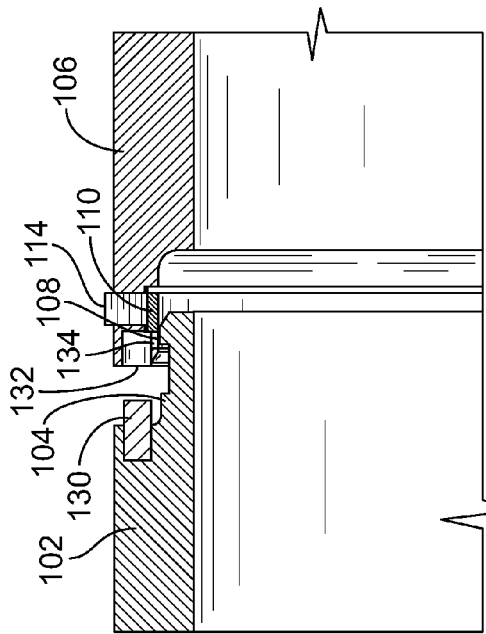
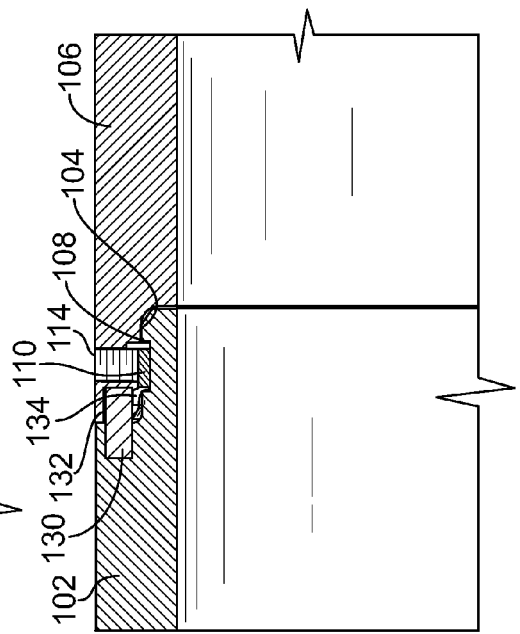
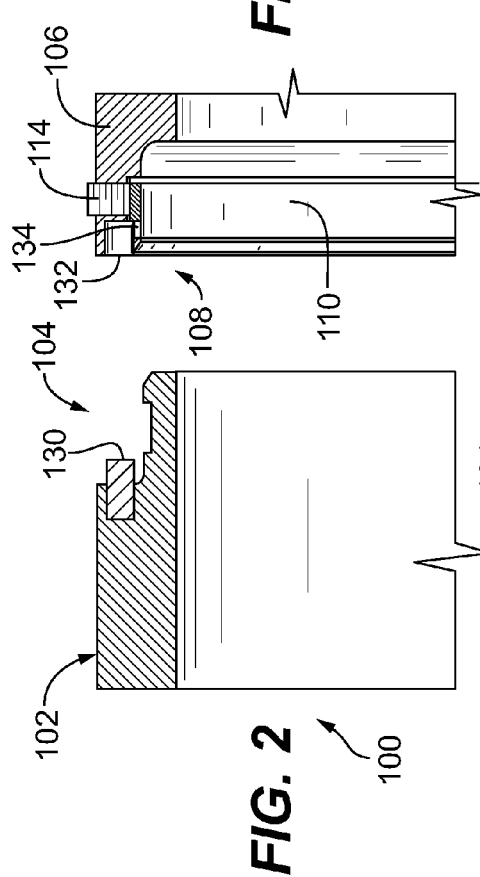
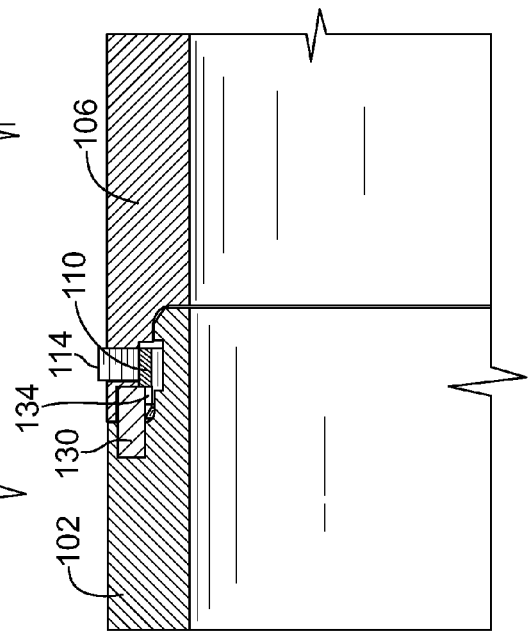
FIG. 2
FIG. 3
FIG. 4
FIG. 5

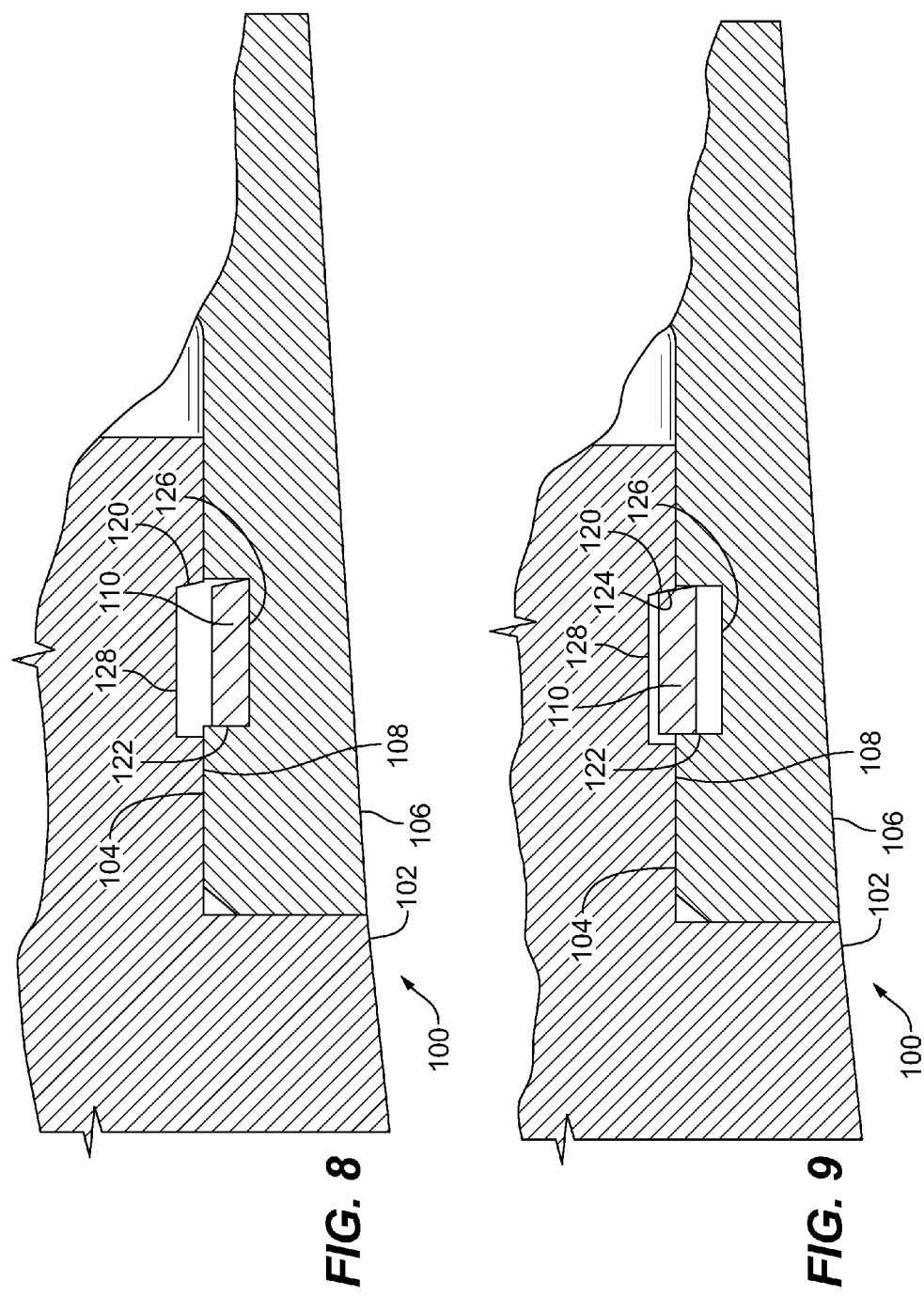

RING COUPLINGS

BACKGROUND OF THE INVENTION

1. Field of the Invention

The present disclosure relates to couplings, and more particularly to couplings for rings or cylindrical bodies as in rockets and other projectiles.

2. Description of Related Art

Coupling two rings or cylindrical bodies together, as when coupling together two sections of a rockets or the like, typically involves a threaded joint. To join two threaded sections it is necessary to rotate the two threaded sections relative to one another. This can be problematic, for example when mechanical linkages, electrical wiring, or other structures extend from one section into the other. One solution to this problem is to couple the sections together with radial screws. This avoids the need to rotate the two sections relative to one another, but the screws limit the strength of such a joint. For example, care must be exercised where radial screws are used, to ensure the shear limits of the screws are not exceeded.

Such conventional methods and systems have generally been considered satisfactory for their intended purpose. However, there is still a need in the art for improved ring couplings. The present disclosure provides a solution for this need.

SUMMARY OF THE INVENTION

A ring coupling includes a first cylindrical body defining an outward facing coupling surface extending in a circumferential direction. A second cylindrical body defines an inward facing coupling surface extending in the circumferential direction. A retainer ring is engaged to the coupling surfaces of the first and second cylindrical bodies to prevent axial disengagement of the first and second cylindrical bodies.

In certain embodiments, the retainer ring is flexible between first and second positions. In the first position, the retainer ring is seated in the coupling surface of the second cylindrical body to clear the first cylindrical body for assembly of the first and second cylindrical bodies together. In the second position, the retainer ring is flexed radially inward from the first position to engage the coupling surface of the first cylindrical body. The retainer ring can be a split ring with a circumferential gap to facilitate inward flexure of the retainer ring. A plurality of set screws can be threaded to the second cylindrical body to maintain the retainer ring in the second position. In the second position, portions of the retainer ring proximate to the set screws can be in engagement with the coupling surface of the first cylindrical body, and portions of the retainer ring circumferentially between the set screws can be biased outward into engagement with the coupling surface of the second cylindrical body.

The coupling surface of the first cylindrical body can define a radially extending lip. The coupling surface of the second cylindrical body can also define a radially extending lip. The retainer ring can be axially compressed between the radially extending lips of the first and second cylindrical bodies, e.g., due to the radial displacement of the retaining ring into the second position. The radially extending lip of one of the first and second cylindrical bodies can be beveled, wherein the retainer ring includes a beveled surface engaged to the beveled radially extending lip for tightening the first and second cylindrical bodies together in an axial direction defined by the first and second cylindrical bodies. For example, the radially extending lip of the first cylindrical body can be the beveled radially extending lip.

It is contemplated that the coupling surface of the second cylindrical body can define a circumferential channel configured to seat the retainer ring in the first position. The coupling surface of the first cylindrical body can define a circumferential channel configured to seat a portion of the retainer ring in the second position. The channels can each include two axially opposed faces. For example, the radially extending lip of the first cylindrical body described above can be one of the channel faces of the first cylindrical body, and the radially extending lip of the second cylindrical body described above can be one of the channel faces of the second cylindrical body.

An alignment pin can extend axially from one of the first and second cylindrical bodies, wherein the alignment pin is registered in a receptacle in the other one of the first and second cylindrical bodies for circumferential alignment of the first and second cylindrical bodies. For example, an alignment pin can extend axially from the second cylindrical body. The retainer ring can define an alignment notch in registration with the alignment pin for circumferential alignment of the retainer ring.

In embodiments, the first and second bodies are radially interlocked to prevent radial separation of the first and second bodies. The set screws can be axially positioned proximate to one axial edge of the retainer ring to provide more thickness in the second cylindrical body for thread engagement between the set screws and the second cylindrical body. It is also contemplated that the retainer ring can include a plurality of slits for facilitating radial locking engagement of one axial end of the retaining ring.

A method of coupling cylindrical bodies includes axially advancing an outward facing coupling surface of a first cylindrical body into engagement with an inward facing engagement surface of a second cylindrical body. The method also includes driving portions of a retainer ring into engagement with the coupling surface of the first cylindrical body, wherein portions of the retainer ring are biased into engagement with the engagement surface of the second cylindrical body to prevent axial disengagement of the first and second cylindrical bodies. Axially advancing and driving portions of a retainer ring into engagement can be performed without relative circumferential rotation of the first and second cylindrical bodies.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a cross-sectional side elevation view of a portion of the ring coupling of FIG. 1, showing the retainer ring seated in the coupling surface channel of one of the cylindrical bodies;

FIG. 3 is a cross-sectional side elevation view of a portion of the ring coupling of FIG. 1, showing the retainer ring clearing the outward facing engagement surface during assembly of the engagement surfaces of the cylindrical bodies;

FIG. 4 is a cross-sectional side elevation view of a portion of the ring coupling of FIG. 1, showing the alignment pin extending axially from one of the cylindrical bodies into a receptacle of the other cylindrical body;

FIG. 5 is a cross-sectional side elevation view of a portion of the ring coupling of FIG. 1, showing the retainer ring advanced into engagement with the engagement surface of the outward facing engagement surface to prevent axial disengagement of the cylindrical bodies;

FIG. 8 is a cross-sectional side elevation view of a portion of the ring coupling of FIG. 1, showing the retainer ring in the first position also shown in FIG. 4;

FIG. 9 is a cross-sectional side elevation view of a portion of the ring coupling of FIG. 1, showing the retainer ring in the second position also shown in FIG. 5 wherein the beveled surfaces of the retainer ring and the outward facing engagement surface tighten the axial engagement of the first and second cylindrical bodies;

DETAILED DESCRIPTION OF THE PREFERRED EMBODIMENTS

Figure 1:
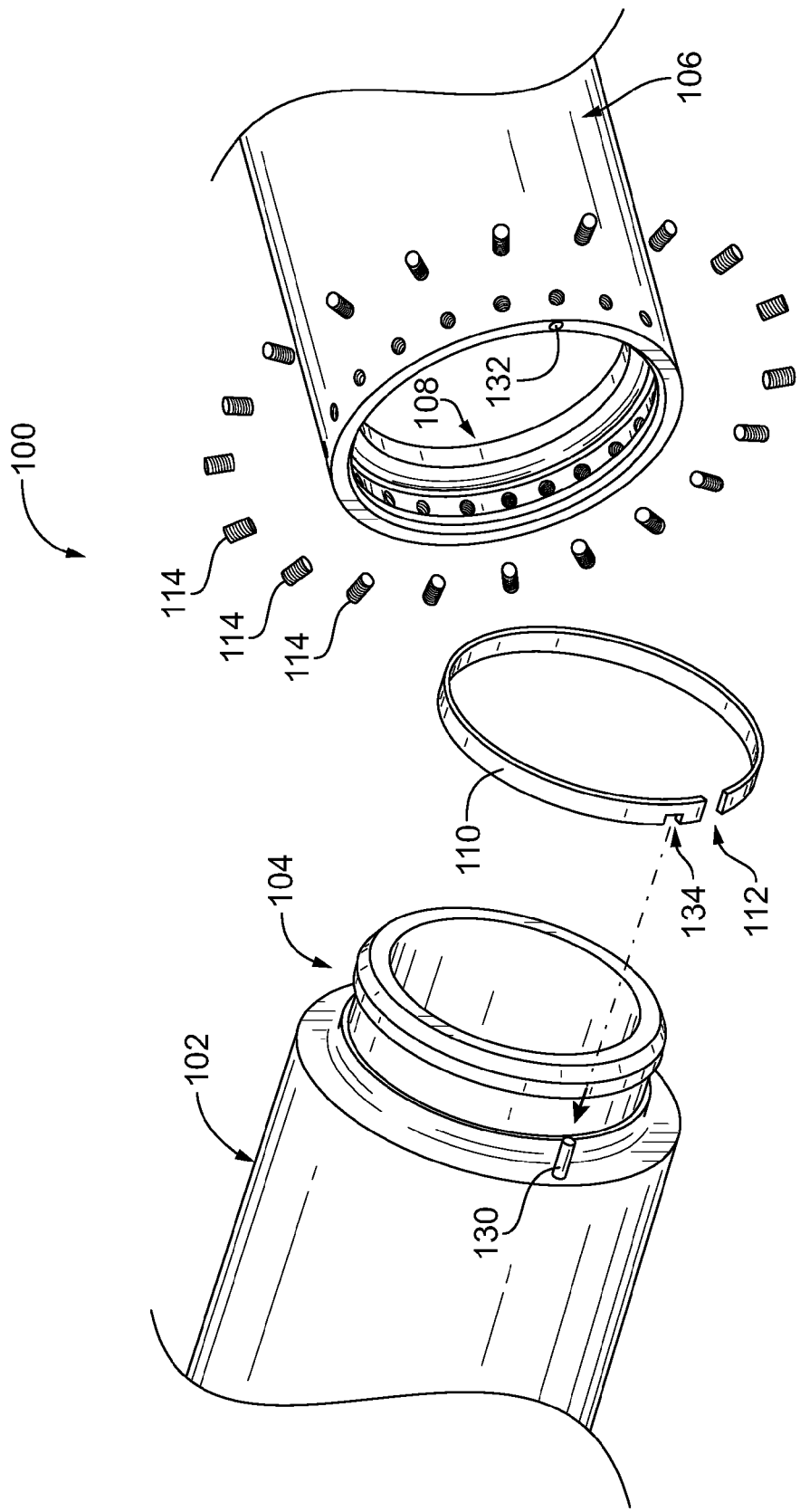
FIG. 1 is an exploded perspective view of an exemplary embodiment of a ring coupling constructed in accordance with the present disclosure, showing the cylindrical bodies and the retaining ring.

Reference will now be made to the drawings wherein like reference numerals identify similar structural features or aspects of the subject disclosure. For purposes of explanation and illustration, and not limitation, a partial view of an exemplary embodiment of a ring coupling in accordance with the disclosure is shown in FIG. 1 and is designated generally by reference character 100. Other embodiments of ring couplings in accordance with the disclosure, or aspects thereof, are provided in FIGS. 2-9, as will be described. The systems and methods described herein can be used to couple rings and other cylindrical bodies, such as for joining sections of rockets together or the like.

Ring coupling 100 includes a first cylindrical body 102 defining an outward facing coupling surface 104 extending in a circumferential direction. A second cylindrical body 106 defines an inward facing coupling surface 108 extending in the circumferential direction. The end portion of the first cylindrical body 102 has an outer diameter that fits within the inner diameter of the corresponding end portion of second cylindrical body 106 as shown in FIGS. 4-5. A retainer ring 110 is engaged with the coupling surfaces 104 and 108 to prevent axial disengagement of the first and second cylindrical bodies 102 and 106.

Referring now to FIG. 2, retainer ring 110 is flexible between first and second positions. In the first position, shown in FIG. 2, retainer ring 110 is seated deeply enough in the coupling surface 108 of the second cylindrical body 106 to clear the first cylindrical body 102 for assembly of the first and second cylindrical bodies 102 and 106 together. In FIG. 3, cylindrical bodies 102 and 106 are shown during assembly at a stage where the retainer ring 110 is clearing the outward facing coupling surface 108. Cylindrical bodies 102 and 106 are advanced together in the axial direction until they reach the position shown in FIG. 4, where retainer ring 110 can be moved from the first position to the second position. In the second position, shown in FIG. 5, retainer ring 110 is flexed radially inward from the first position, shown in FIG. 4, to engage the coupling surface 104 of first cylindrical body 102. Retainer ring 110 is a split ring, as shown in FIG. 1, with a circumferential gap 112 to facilitate inward flexure of retainer ring 110.

A plurality of set screws 114 are threaded to second cylindrical body 106 to drive retainer ring 110 to and maintain retainer ring 110 in the second position. FIG. 4 shows one of the set screws 114 in the first position, and FIG. 5 shows the set screw 114 advanced radially inward to place retainer ring 110 into the second position.

Figure 6:
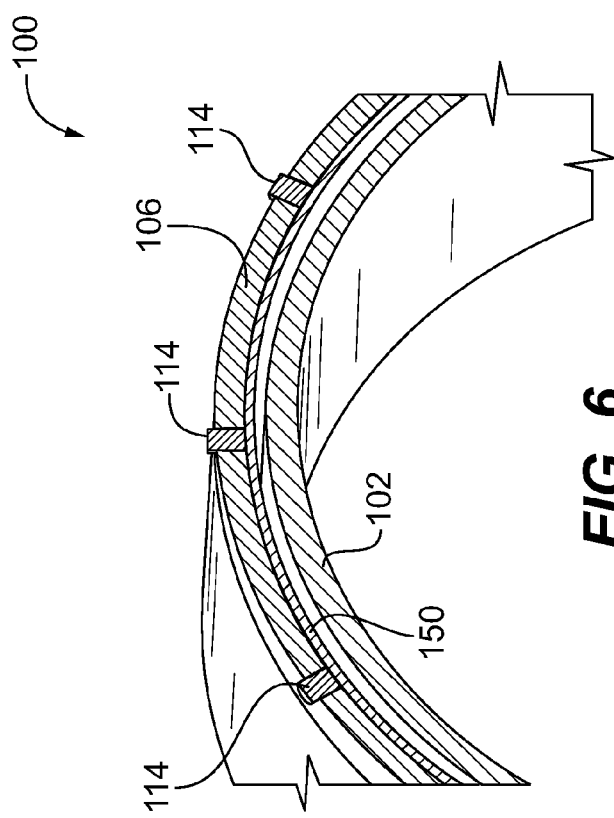
FIG. 6 is a cross-sectional perspective view of a portion of the ring coupling of FIG. 1, showing an exemplary embodiment of a non-split retainer ring in the first position.

With reference now to FIG. 6, a non-split retainer ring 150 is described, i.e., wherein retainer ring 150 does not include a notch 112 as shown in FIG. 1. When set screws 114 are in the first position, retainer ring 150 is biased outward. In the second position, shown in FIG. 7, portions 116 of retainer ring 150 proximate the set screws 114 are in engagement with the coupling surface 104 of the first cylindrical body. The other portions 118 of retainer ring 150 circumferentially between the set screws 114 are biased outward into engagement with the coupling surface 108 of the second cylindrical body 106. In the second position, retainer ring 150 is engaged to both couplings surfaces 104 and 108 to prevent axial disengagement of cylindrical bodies 102 and 106.

Referring to FIG. 8, the coupling surface 104 of first cylindrical body 102 defines a radially extending lip 120. Coupling surface 108 of second cylindrical body 106 also defines a radially extending lip 122. In the second position shown in FIG. 9, retainer ring 110 is axially compressed between the radially extending lips 120 and 122. Lip 120 is beveled, and retainer ring 110 includes a beveled surface 124 engaged to the beveled radially extending lip 120 for tightening the first and second cylindrical bodies 102 and 106 together in the axial direction defined by the first and second cylindrical bodies 102 and 106. Since axial engagement is maintained by retainer ring 110 (primarily in compression) and the lips 120 and 122 (e.g., in bearing), set screws 114 are not loaded in shear as in traditional radial screw ring couplings. There is some loading along the axes of the screws due to the taper in lip 120 and surface 124. This arrangement can provide better tension strength to ring coupling 100 than in traditional couplings. Moreover, since the set screws 114 do not need to directly engage first cylindrical body 102, bores for set screws 114 do not need to be formed in first cylindrical body 102 as would be needed in traditional ring couplings with radial screws. In short, the lack of screw holes in first cylindrical body 102 makes for less manufacturing steps and greater inherent strength than in traditional ring couplings with radial screws, where both bodies have radial holes weakening both.

Coupling surface 108 of second cylindrical body 106 defines a circumferential channel 126 configured to seat the retainer ring 110 in the first position as shown in FIG. 8. Coupling surface 104 of the first cylindrical body 102 defines a circumferential channel 128 configured to seat the retainer ring 110 in the second position as shown in FIG. 9. The channels 126 and 128 each include two axially opposed faces, one of which is the respective radially extending lip 122 and 120, respectively, for each of the channels 126 and 128.

It is worth noting that the ring coupling 100 when unlocked has the retainer ring 110 wholly contained within the channel 126 in body 106, and that during the locking process retainer ring 110 is forced approximately half way out of this channel 126 in order to engage channel 128 on the other body 102. As a consequence, when the joint is locked, channel 126 in body 106 is about twice as deep as necessary. This extra groove depth lowers the strength of body 106. Secondly, retainer ring 110 is only engaged radially within body 106 by half as much depth as it had available when unlocked. Any suitable design variant can be employed to optimize the joint configuration for additional strength where necessary. Two examples of such variants follow.

The first example is when the body walls, e.g., of bodies 102 and 106, are comparatively thin relative to their diameter and sufficient axial length is available, one axial end of the retainer ring 110 can remain entirely within body 106 even after locking with the channel 126 only as deep as necessary to provide sufficient bearing area for supporting the load, while the other axial end of retainer ring 110 is deflected by the set screws 114 into the channel 128 of body 106. This arrangement would arrange the set screws 114 biased axially to the deflected end of retainer ring 110 so the radial set screw force can be applied with maximum advantage to the axial end of retainer ring 110 that needs to be deflected. To facilitate this deflection, the ring can have axial slits between each set screw; these slits would cut through the ring radially from the deflected axial end of the ring and extending toward the non-deflecting end, but not so far as to cut the ring into separate pieces. An exemplary embodiment with slits in the retainer ring is shown and described further with reference to FIGS. 11 and 12 below.

The second example is for heavily loaded joints with thick walls. In such applications, the axial set screw force necessary to resolve the radial lock force resulting from the groove and lock ring taper (e.g., as shown and described with respect to FIGS. 8-9) would require a large wall thickness for sufficient set screw thread engagement. The need for sufficient screw thread engagement would result in a shallow groove depth, e.g., in body 106, and a commensurately thin retainer ring. To preserve retainer ring thickness for high load capacity while simultaneously providing more axial thread length for the set screws, the set screws can be located at or near the axial end of the lock ring that engages into the inner body, e.g., body 102, and the channel and retainer ring can be tapered so more wall thickness is made available to provide more thread engagement for the set screws. The other axial end of the channel has full depth to provide for sufficient bearing area for retainer ring and channel engagement. An exemplary embodiment of this variant is shown and further described with respect to FIG. 10 below.

Referring again to FIG. 1, an alignment pin 130 extends axially from cylindrical body 102. When assembled as shown in FIG. 5, alignment pin 130 is registered in a receptacle 132 in cylindrical body 106 for circumferential alignment of the first and second cylindrical bodies 102 and 106. Similarly, retainer ring 110 defines an alignment notch 134 in registration with alignment pin 130, as shown in FIG. 4, for circumferential alignment of retainer ring 110 with the circumferential bodies 102 and 106. Circumferential alignment of retainer ring 110 can be advantageous for assembly, and those skilled in the art will readily appreciate that any other suitable keying features can be used for alignment of bodies 102 and 106 and/or retainer ring 110, including using separate keying features for alignment of body 102 with body 106, and for alignment of retainer ring 110 with the bodies 102 and 106. It is also contemplated that radial keys can be used for alignment of the retainer ring 110 and bodies 102 and 106.

Figure 7:
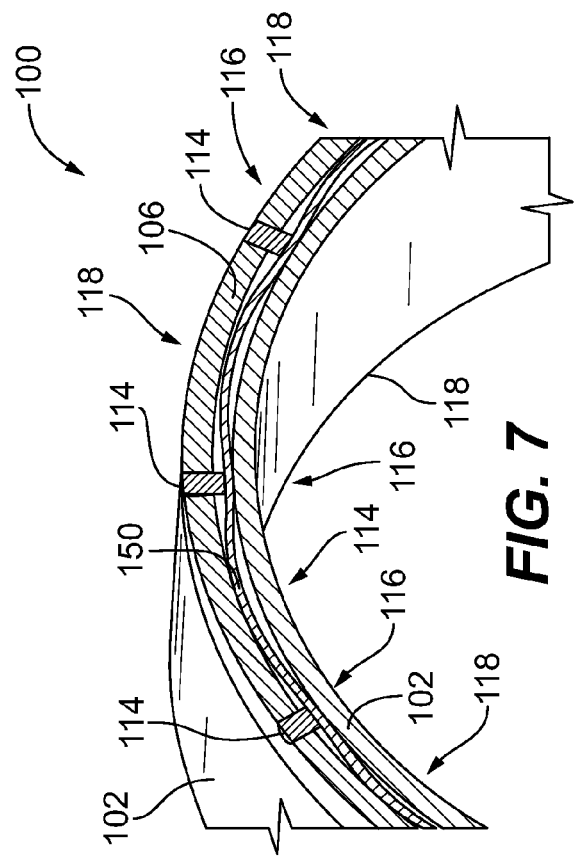
FIG. 7 is a cross-sectional perspective view of a portion of the ring coupling of FIG. 1, showing the non-split retainer ring in the second position.

A method of coupling cylindrical bodies includes axially advancing an outward facing coupling surface of a first cylindrical body into engagement with an inward facing engagement surface of a second cylindrical body, e.g., as indicated in FIGS. 2-4. The method also includes driving, e.g. by driving in set screws, portions of a retainer ring into engagement with the coupling surface of the first cylindrical body, wherein portions of the retainer ring are biased into engagement with the engagement surface of the second cylindrical body to prevent axial disengagement of the first and second cylindrical bodies, e.g., as shown in FIG. 7. Axially advancing and driving portions of a retainer ring into engagement can be performed without relative circumferential rotation of the first and second cylindrical bodies. This can be advantageous, for example, in assembling rocket or projectile rings housing components that may not be twisted or circumferentially misaligned.

Figure 10:
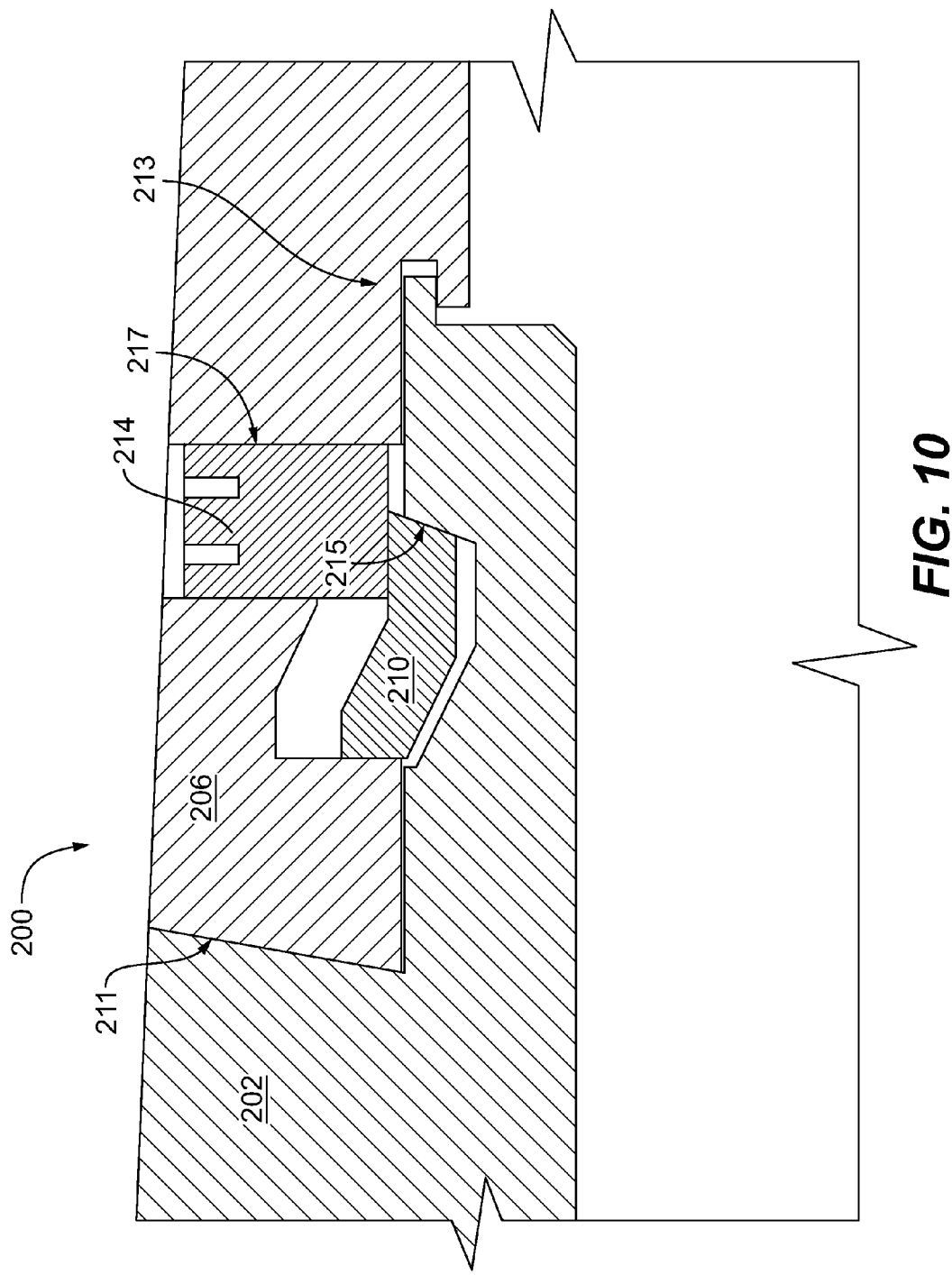
FIG. 10 is a cross-sectional side elevation schematic view of another exemplary embodiment of a ring coupling in accordance with the present disclosure, showing radial interlocking features.

Since expansion (dilation) of the inward facing engagement surface, e.g., of body 106, tends to loosen or disengage the retainer ring 110, it can be advantageous to prevent dilation by radial engagement of the engagement portion of the second body, e.g., body 106, with the wall of the first body, e.g., body 102. Referring to FIG. 10, two examples of radial engagement of the engagement portion of the first body, e.g., body 202, with the second body 206 are described. This radial engagement can be accomplished in any other suitable way. The two examples are: using a fully assembled axial contact with a tapered or conical surface 211 as shown in FIG. 10; and using a lip and ledge arrangement 213 where the lip is trapped under the ledge of the other body or one body as also shown in FIG. 10. In coupling 200 of FIG. 10, the first and second bodies 202 and 206 are radially interlocked using both of the examples above to prevent radial separation of the first and second bodies. The set screws 214 are axially positioned proximate to one axial edge 215 of the retainer ring to provide more thickness in the second cylindrical body 206 for thread engagement 217 between the set screws and the second cylindrical body.

Figure 11:
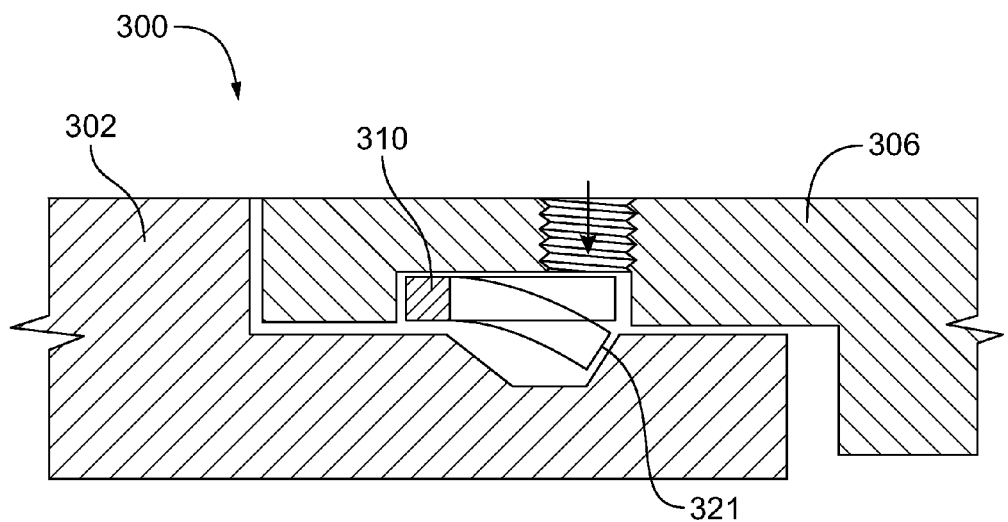
FIG. 11 is a cross-sectional side elevation schematic view of another exemplary embodiment of a ring coupling in accordance with the present disclosure, showing flexure of one axial end of the retainer ring for locking engagement.
Figure 12:
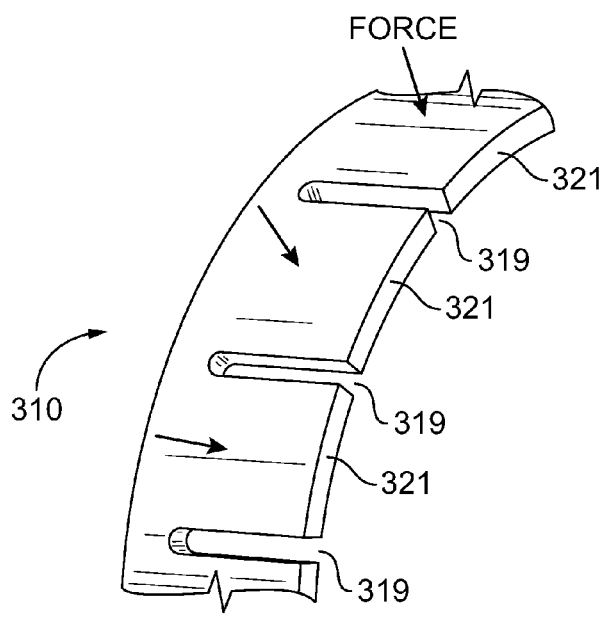
FIG. 12 is a perspective view of a portion of the retainer ring of FIG. 11, showing the slits for facilitating locking engagement of the retainer ring.

With reference now to FIGS. 11 and 12, another exemplary coupling 300 is described. Retainer ring 310 includes slits 319 extending axially from one axial end thereof for flexure under the set screw forces, as indicated schematically in FIG. 12 by the heavy arrows. This facilitates radial locking engagement of one axial end 321 of the retaining ring 310, as indicated schematically in FIG. 11, which shows the engagement of retaining ring 310 with bodies 302 and 306.

The methods and systems of the present disclosure, as described above and shown in the drawings, provide for ring couplings with superior properties including better axial strength than traditional couplings and the ability to assemble without relative rotation of cylindrical components. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A ring coupling comprising:
a first cylindrical body defining an outward facing coupling surface extending in a circumferential direction;
a second cylindrical body defining an inward facing coupling surface extending in the circumferential direction; and
a retainer ring engaged to the coupling surfaces of the first and second cylindrical bodies to prevent axial disengagement of the first and second cylindrical bodies;
wherein the retainer ring is flexible between: a first position seated in the coupling surface of the second cylindrical body to clear the first cylindrical body for assembly of the first and second cylindrical bodies together; and a second position flexed radially inward from the first position to engage the coupling surface of the first cylindrical body; and
further comprising a plurality of set screws threaded to the second cylindrical body to maintain the retainer ring in the second position;
wherein in the second position portions of the retainer ring proximate to the set screws are in engagement with the coupling surface of the first cylindrical body, wherein portions of the retainer ring circumferentially between the set screws are biased outward into engagement with the coupling surface of the second cylindrical body.

2. A ring coupling as recited in claim 1, wherein the coupling surface of the second cylindrical body defines a circumferential channel configured to seat the retainer ring in the first position.

3. A ring coupling as recited in claim 1, wherein the coupling surface of the first cylindrical body defines a circumferential channel configured to seat the retainer ring in the second position.

4. A ring coupling as recited in claim 3, wherein the channel includes two axially opposed faces, wherein at least one of the faces is beveled, and wherein the retainer ring includes a beveled surface engaged to the beveled surface of the channel for tightening the first and second cylindrical bodies together in an axial direction defined by the first and second cylindrical bodies.

5. A ring coupling as recited in claim 1, wherein the retainer ring is a split ring with a circumferential gap to facilitate inward flexure of the retainer ring.

6. A ring coupling as recited in claim 1, wherein the coupling surface of the first cylindrical body defines a radially extending lip, wherein the coupling surface of the second cylindrical body defines a radially extending lip, and wherein the retainer ring is axially compressed between the radially extending lips of the first and second cylindrical bodies.

7. A ring coupling as recited in claim 6, wherein the radially extending lip of one of the first and second cylindrical bodies is beveled, wherein the retainer ring includes a beveled surface engaged to the beveled radially extending lip for tightening the first and second cylindrical bodies together in an axial direction defined by the first and second cylindrical bodies.

8. A ring coupling as recited in claim 6, wherein the radially extending lip of the first cylindrical body is beveled, wherein the retainer ring includes a beveled surface engaged to the beveled radially extending lip for tightening the first and second cylindrical bodies together in an axial direction defined by the first and second cylindrical bodies.

9. A ring coupling as recited in claim 1, wherein the first and second bodies are radially interlocked to prevent radial separation of the first and second bodies.

10. A ring coupling as recited in claim 1, further comprising a plurality of set screws threaded to the second cylindrical body to maintain the retainer ring in the second position, wherein the set screws are axially positioned proximate to one axial edge of the retainer ring to provide more thickness in the second cylindrical body for thread engagement between the set screws and the second cylindrical body.

11. A ring coupling as recited in claim 1, wherein the retainer ring includes a plurality of slits for facilitating radial locking engagement of one axial end of the retaining ring.

12. A ring coupling comprising:
a first cylindrical body defining an outward facing coupling surface extending in a circumferential direction;
a second cylindrical body defining an inward facing coupling surface extending in the circumferential direction;
a retainer ring engaged to the coupling surfaces of the first and second cylindrical bodies to prevent axial disengagement of the first and second cylindrical bodies; and
further comprising an alignment pin extending axially from the second cylindrical body, wherein the retainer ring defines an alignment notch in registration with the alignment pin for circumferential alignment of the retainer ring.

* * * * *